United States Patent [19]

Noguchi et al.

[11] Patent Number: 5,217,661
[45] Date of Patent: Jun. 8, 1993

[54] METHOD OF REMOVING RESINOUS MATERIALS ADHERING TO INJECTION HEAD

[75] Inventors: Hiroyuki Noguchi; Yasuo Watanabe, both of Sayama, Japan

[73] Assignee: Honda Giken Kogyo Kabushiki Kaisha, Tokyo, Japan

[21] Appl. No.: 857,256

[22] Filed: Mar. 25, 1992

[30] Foreign Application Priority Data

Apr. 3, 1991 [JP] Japan .................................. 3-71242

[51] Int. Cl.⁵ ............................................ B29C 45/27
[52] U.S. Cl. ...................................... 264/39; 264/161; 264/328.6
[58] Field of Search ................. 264/39, 46.4, 138, 161, 264/162, 328.4, 328.6, 328.11; 425/225

[56] References Cited

U.S. PATENT DOCUMENTS

| | | | |
|---|---|---|---|
| 2,102,328 | 12/1937 | Morin et al. | 264/161 |
| 2,360,000 | 10/1944 | Lawyer | 425/225 |
| 3,814,780 | 6/1974 | Woodhall | 264/39 |
| 4,655,274 | 4/1987 | Dannoura | 264/328.11 |
| 4,820,467 | 4/1989 | Ehrler et al. | 264/161 |

FOREIGN PATENT DOCUMENTS

| | | | |
|---|---|---|---|
| 406755 | 1/1991 | European Pat. Off. | 425/225 |
| 64-57019 | 4/1989 | Japan . | |
| 1151472 | 4/1985 | U.S.S.R. | 425/225 |

OTHER PUBLICATIONS

Lee, Ly James, "Impingement Mixing in Reaction Injection Molding", *Polymer Engineering and Science*, Sep. 1980, vol. 20, No. 13, pp. 868-874.

*Primary Examiner*—Jill L. Heitbrink

[57] ABSTRACT

A method of and an apparatus for automatically removing deposits such as resin materials adhering to an injection head. According to the method, a liquid reactive resin is poured into a molding cavity internally defined in a mold assembly from an injection head through an injection hole. Then, an automatic cutting device is displaced toward the injection head separated from the injection hole after the reactive resin poured into the molding cavity has been hardened. Thereafter, the automatic cutting device is activated to cut unnecessary hardened resin materials adhering to the injection head. Thus, the hardened resin materials can reliably be removed without subjecting the injection head to damage. It is also possible to effectively prevent the reactive resin from adhering to the injection head when the next molding process is carried out. Further, since a resin material removing process is automatically performed, any burden imposed on an operator can be lightened and the entire molding process can efficiently be carried out.

2 Claims, 6 Drawing Sheets

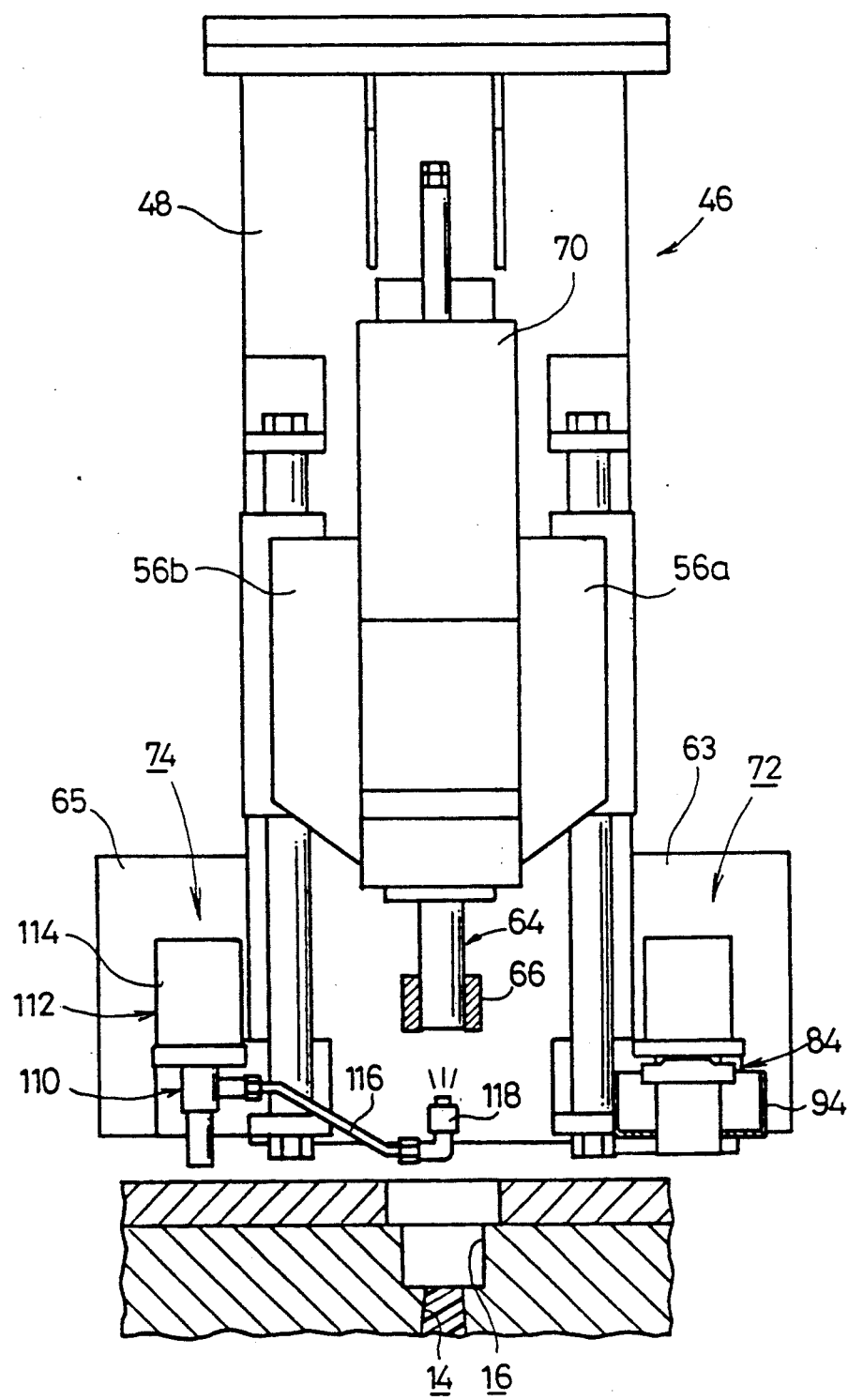

METHOD OF REMOVING RESINOUS MATERIALS ADHERING TO INJECTION HEAD

BACKGROUND OF THE INVENTION

1. Field of the Invention

The present invention relates to a method of and an apparatus for automatically removing resinous materials adhering to and hardened at an injection head used to pour a liquid reactive resin into a mold assembly.

2. Description of the Related Art

As an interior member for forming a vehicle body, there has heretofore been used a resin molding integrally formed by a covering sheet with an embossed pattern applied thereon and a foaming resin.

In this case, a resin feed mechanism is used to produce the resin molding. The resin feed mechanism has an injection head held in front of an injection hole used for pouring a molten resin into a cavity defined in a mold assembly. Molten reactive resins (stock solution) such as polyol, isocyanate, etc. are mixed together to produce a mixture, which is, in turn, poured into the cavity from the injection head. Then, the mixture is hardened in the cavity to produce a hardened resin. Thereafter, a covering sheet disposed in the mold assembly in advance and the produced hardened resin are integrally formed to produce a desired molded product.

The injection head is fitted in the injection hole to close or block its opening until the reactive resin is hardened in the cavity. Therefore, the reactive resin partly adheres to the leading end of the injection head. Alternatively, the reactive resin adheres to the leading end of the injection head due to the drooling of the reactive resin. It is thus necessary to remove the resinous materials adhering to the leading end of the injection head in order to carry out the next molding process.

As has been disclosed in Japanese Utility Model Application Laid-Open No. 64-57019, for example, there has therefore been proposed an apparatus of a type wherein a resilient coil spring is disposed in a groove defined in the vicinity of a molten-resin injection hole defined in a mold assembly, and blades mounted on the leading end of the coil spring are vertically displaced to be held at a right angle to a resin injection passage by a resilient force of the coil spring upon opening of the mold assembly to enable the cutoff of the resin injection passage, thereby making it possible to cut or scrape off the resinous materials such as the reactive resin adhering to the injection hole.

In the above disclosure, it is, however, necessary to mount the blades on the coil spring which extends and shrinks each time the mold assembly is closed. Therefore, the disclosure has the problem that preparations for mounting the blades on the coil spring are considerably cumbersome and the entire work cannot efficiently and automatically be carried out. Further, since the resinous materials adhering to the injection hole are cut by the blades using the resilient force of the coil spring, the direction in which the coil spring extends is not constant, thereby causing the problem that the blades are positionally displaced and the leading end of the injection head is damaged by cutting or scraping action as the case may be.

SUMMARY OF THE INVENTION

It is a principal object of the present invention to provide a method of and an apparatus for completely removing resinous materials adhering to an injection head, of a type wherein the injection head can be prevented from damage and a desired molded product can efficiently and automatically be obtained.

It is another object of the present invention to provide a method of removing resinous materials adhering to an injection head, which comprises the following steps: a first step of pouring a liquid reactive resin into a molding cavity internally defined in a mold assembly from an injection head through an injection hole defined in the mold assembly, a second step of displacing automatic cutting means toward the injection head separated from the injection hole after the reactive resin poured into the molding cavity has been hardened, and a third step of cutting away the resin adhering to the injection head by the automatic cutting means.

It is a further object of the present invention to provide a method wherein the first step comprises the following processes a process for activating an actuator A so as to lower a pair of first movable bodies along guide bars respectively and moving the injection head downward by a mixing head mounted on the first movable bodies, thereby fitting the injection head in the injection hole, a process for activating an actuator B so as to move a rod upward thereby to cause passages blocked by the outer peripheral surface of the rod to communicate with each other, and a process for pouring the reactive resin into the injection hole formed in confronting relationship to the molding cavity from the injection head through the passages communicating with each other and a mixing passage which communicates with the passages.

It is a still further object of the present invention to provide a method wherein the second step comprises the following processes: a process for activating the actuator B so as to lower the rod, thereby closing and cutting off the passages, a process for activating the actuator B after the reactive resin poured into the molding cavity has been hardened so as to cause the first movable bodies to space the injection head from the injection hole formed in confronting relationship to the molding cavity by a predetermined distance, and a process for activating an actuator C so as to turn a second movable table with the automatic cutting means mounted thereon through about 90° about a pin thereby to position rotatable blades of a rotatable cutter in confronting relationship to the injection head which extends substantially in the vertical direction.

It is a still further object of the present invention to provide a method wherein the third step comprises the following processes a process for activating an actuator D so as to elevate the second movable table and for energizing an air motor to cause a timing belt to rotate the rotatable blades of the rotatable cutter, and a process for rotating the rotatable blades so as to cut the reactive resin adhering to and hardened at the lower ends of the injection head and a seat portion.

It is a still further object of the present invention to provide a method wherein the third step further includes a process for sucking and collecting the cut reactive resin through a cover member for enclosing the periphery of the rotatable cutter when the hardened reactive resin is cut under the rotation of the rotatable blades of the rotatable cutter.

It is a still further object of the present invention to provide an apparatus for removing resinous materials adhering to an injection head, which is suitable for use in molding equipment for pouring a liquid resin material into a molding cavity internally defined in a mold assembly so as to create a molded product having the configuration corresponding to that of the molding cavity, the apparatus comprising automatic cutting means having rotatable blades for cutting or removing the resin material which adheres to a resin injection head fitted in a resin injection hole defined in the mold assembly and which is exposed outwardly of the injection head while a rotative drive source is being energized, and displacing means for displacing the automatic cutting means toward the injection head.

It is a still further object of the present invention to provide an apparatus wherein the automatic cutting means comprises a movable table angularly movable under the control of a cylinder, a rotative drive source fixedly mounted on the movable table, a rotatable cutter having rotatable blades mounted thereon, the rotatable cutter having first rotational force transmitting means supported by the rotative drive source and second rotational force transmitting means for rotating the rotatable cutter, the second rotational force transmitting means being supported by the rotatable cutter and rotated in response to the rotational force transmitted by the first rotational force transmitting means.

It is a still further object of the present invention to provide an apparatus wherein the first and second rotational force transmitting means comprise pulleys respectively and a timing belt is trained around the first and second rotational force transmitting means.

It is a still further object of the present invention to provide an apparatus wherein the displacing means comprises a cylinder fixedly mounted on a second movable body, a movable table coupled via a pin member to the second movable body, and a joint member attached to the leading end of a rod of the cylinder so as to couple the rod and the movable table to each other.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 6 is a partial cross-sectional view depicting the manner of the operation of a parting-agent applying mechanism employed in the reactive resin feeding apparatus.

DETAILED DESCRIPTION OF THE PREFERRED EMBODIMENTS

A method of removing deposited materials, i.e., resinous materials adhering to an injection head, according to the present invention will hereinafter be described in detail in connection with an apparatus for removing the resinous materials adhering to the injection head with reference to the accompanying drawings in which a preferred embodiment is shown by way of illustrative example.

Figure 1:
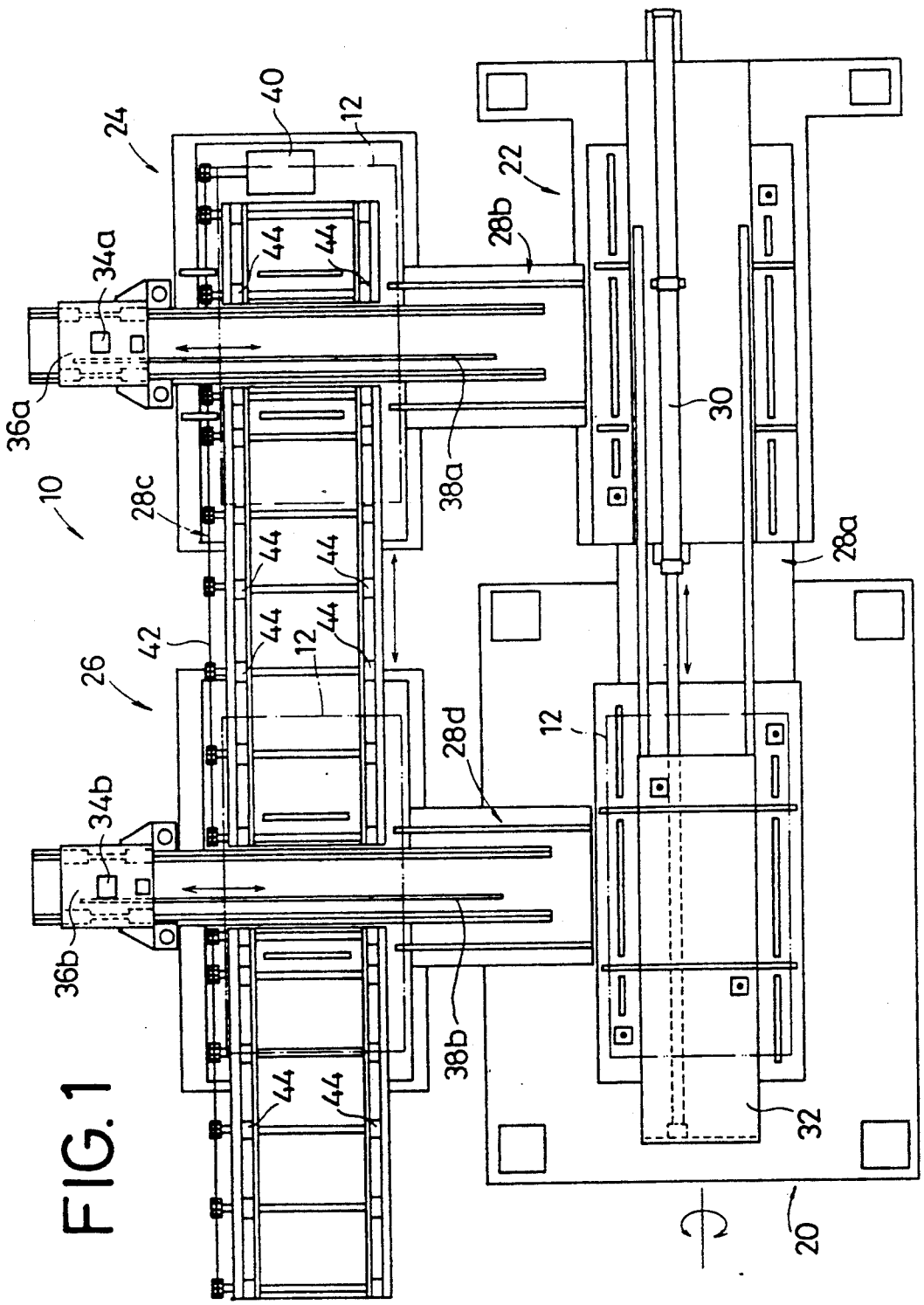
FIG. 1 is plan view showing molding equipment in which a reactive resin feeding apparatus is to be incorporated.

Referring now to FIG. 1, reference numeral 10 indicates molding equipment provided with a reactive resin feeding apparatus according to one embodiment of the present invention. The molding equipment 10 basically comprises a first station 20 for placing covering sheets on cavities 14 defined in a plurality of molding assemblies 12 and for taking out or removing molded products therefrom, a second station 22 (see FIG. 3) for pouring or injecting liquid reactive resins (foaming resins) into the cavities 14 from filler or injection holes 16 of the molding assemblies 12 respectively, and third and fourth stations 24, 26 for hardening the reactive resins to stand by.

The first through fourth stations 20, 22, 24, 26 are coupled to one another in the form of a loop by means of first through fourth delivery paths, i.e., first through fourth feeders 28a through 28d, for successively circulating the molding assemblies 12 through these stations.

The first feeder 28a has a carriage 32 movable back and forth by a cylinder 30 as an actuator. The second feeder 28b and the fourth feeder 28d have first movable tables 36a, 36b with motors 34a, 34b mounted thereon, respectively, to which an unillustrated pinion maintained in meshing engagement with elongated racks 38a, 38b are coupled. The third feeder 28c has a plurality of feed rollers 44 rotated by a chain 42 while a motor 40 is being energized.

Figure 2:
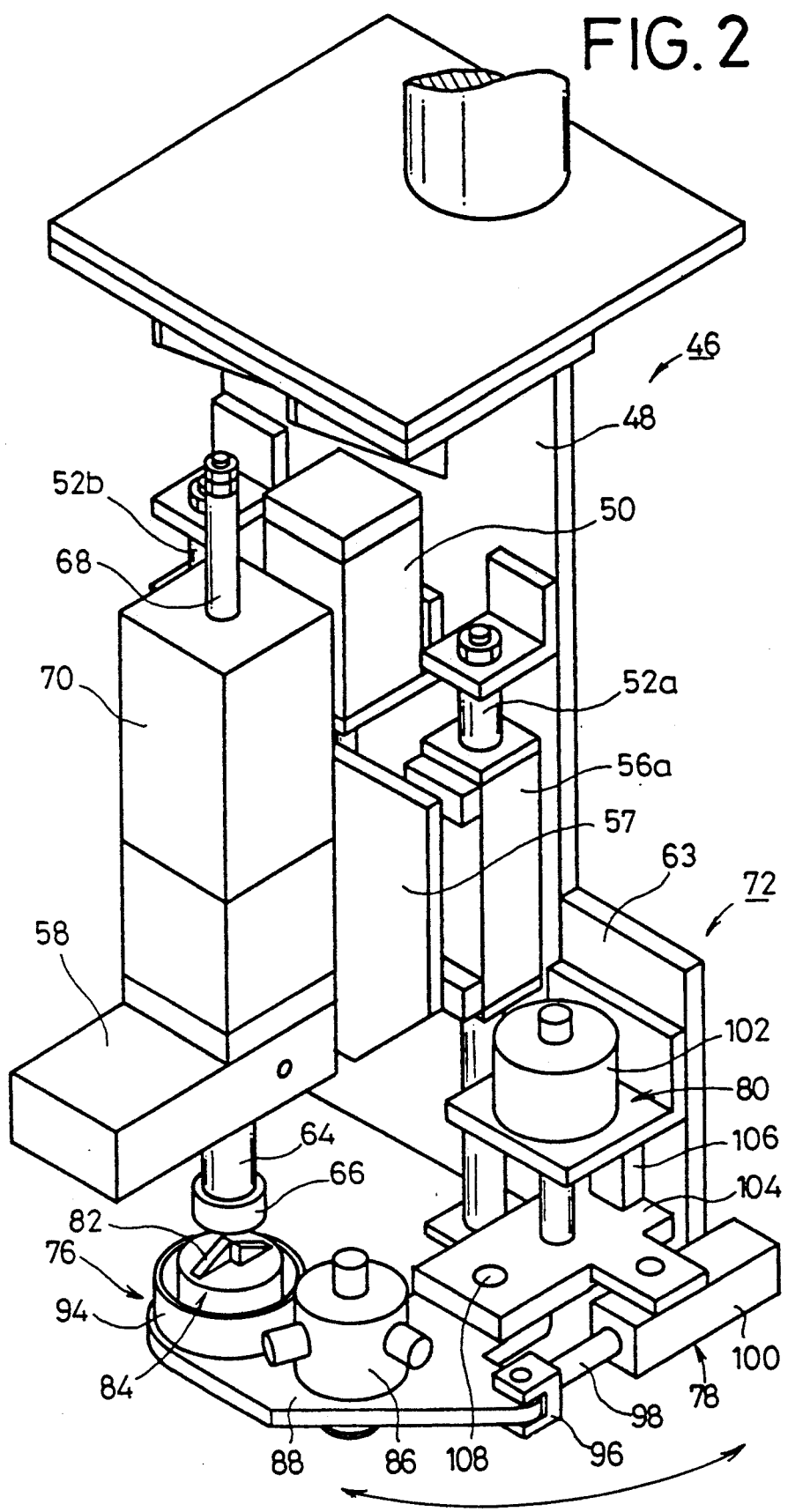
FIG. 2 is a perspective view illustrating a reactive resin feeding apparatus with a deposited-material removing mechanism mounted thereon, according to one embodiment of the present invention.
Figure 3:
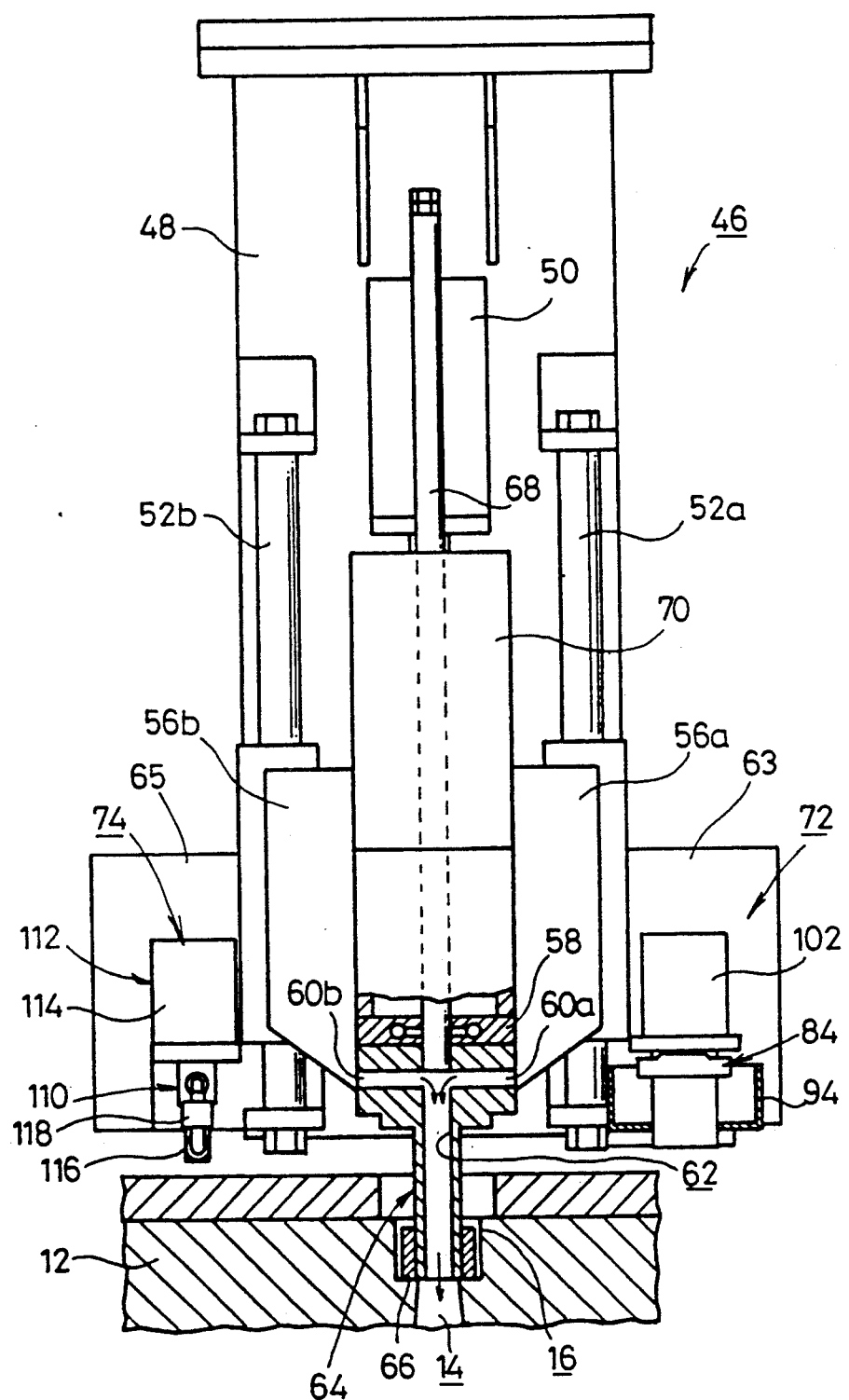
FIG. 3 is a partial cross-sectional view showing the manner in which the reactive resin feeding apparatus supplies a reactive resin.
Figure 4:
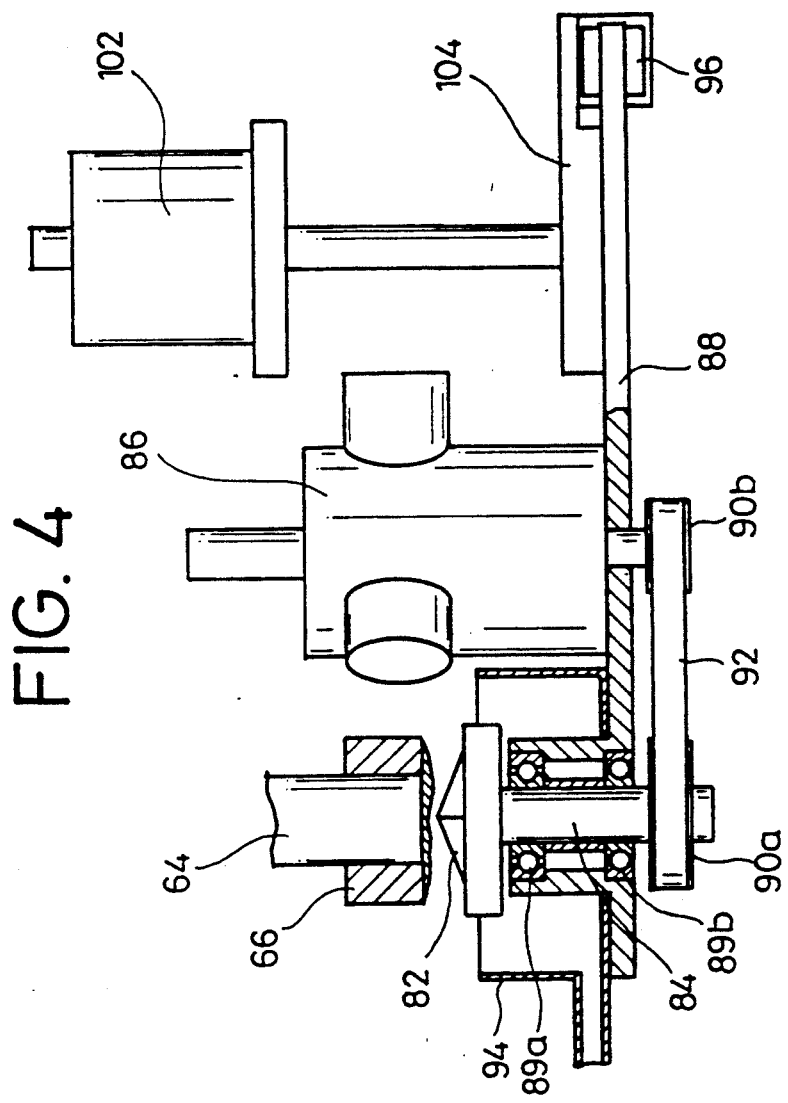
FIG. 4 is a partial cross-sectional view illustrating the relationship between a rotary type cutter and an air motor of a cutting means employed in the deposited-material removing mechanism.

A reactive resin feeding apparatus 46 is disposed in the second station 22. As illustrated in FIGS. 2 through 4, the reactive resin feeding apparatus 46 has a frame 48 which is vertically hung from a position above a mold assembly 12 and on which a cylinder 50 is mounted. A pair of guide bars 52a, 52b are disposed on both sides of the cylinder 50, which enables first movable bodies 56a, 56b to vertically move along the guide bars 52a, 52b respectively. Incidentally, a mixing head 58 is held in front of the first movable bodies 56a, 56b through a plate-like member 57. Thus, the cylinder 50 is actuated to cause the first movable bodies 56a, 56b to vertically displace the mixing head 58. On the other hand, the mixing head 58 has paths or passages 60a, 60b defined in an internal leading end thereof, for causing polyol and isocyanate as reactive resins to flow therethrough in a liquid state (see FIG. 3). The passages 60a, 60b joins at a mixing passage 62 defined in a cylindrical injection head 64. A seat portion 66 is formed in the leading end of the injection head 64. In addition, a cylinder 70 is disposed above the mixing head 58 and has an externally-exposed cylinder rod 68 whose leading end is held in front of the point at which the passages 60a, 60b defined in the mixing head 58 are joined together.

A deposited-material removing mechanism 72 according to the present embodiment is mounted on a plate-like member 63 extending from one of the sides of the frame 48, and a parting-agent applying mechanism 74 is mounted on a plate-like member 65 extending from the other of the sides of the frame 48. The deposited-material removing mechanism 72 comprises an automatic cutting means 76 for cutting a resin material exposed to the outside from the injection head 64, a rotating or turning means 78 for displacing the automatic cutting means 76 toward the position between the injection head 64 and the injection hole 16 of the mold assembly 12, and a vertically moving means 80. The turning means 78 and the vertically moving means 80 constitute a displacing means as a whole.

As shown in FIGS. 2 and 4, the automatic cutting means 76 includes a rotatable cutter 84 having a plurality of rotatable blades 82 mounted on its upper portion, and an air motor 86 as an actuator. The rotatable cutter 84 is mounted on a second movable table 88 by bearings 89a, 89b, whereas the air motor 86 is fixedly mounted on the second movable table 88. The rotatable cutter 84 and the air motor 86 are coupled to each other with a timing belt trained around a pair of pulleys 90a, 90b disposed below the rotatable cutter 84 and the air motor 86. Further, a cover 94 which communicates with a vacuum feed source (not shown) is fixedly mounted on the second movable table 88 disposed around the rotatable cutter 84.

The turning means 78 includes a cylinder 100 from which a cylinder rod 98 extends and is coupled to a joint member 96 fixed via a shaft to the second movable table 88. The cylinder 100 is actuated to turn the second movable table 88 by about 90° so as to hold the rotatable cutter 84 in front of the injection head 64.

In order to move the automatic cutting means 76 toward the injection head 64, the vertically moving means 80 is used. The vertically moving means 80 includes an actuator 102 fixed to the frame 48 and a second movable body 104. Then, the actuator 102 is activated to cause the second movable body 104 supported by a guide bar 106 to move in upward and downward directions. In addition, the second movable body 104 is coupled to the second movable table 88 by a pin 108. Thus, the cylinder 100 is actuated to enable the second movable table 88 to be moved in the direction indicated by the arrow about the pin 108.

As illustrated in FIGS. 3 and 6, the parting-agent applying mechanism 74 comprises an applying or coating means 110 for coating the injection head 64 with a mold-release agent, i.e., a parting agent, and a displacing means 112 for moving the applying means 110 toward the position between the injection head 64 and the injection hole 16 of the mold assembly 12. The displacing means 112 has an arm 116 which is rotatably moved under the control of a motor 114 and to which a coating nozzle 118 communicating with an unillustrated parting-agent feed source is attached.

The operation of the molding equipment 10 provided with the reactive resin feeding apparatus 46 according to the present embodiment, which has been constructed as described above, will now be described in connection with the method referred to above.

A mold assembly 12 is opened at the first station 20, and a covering sheet and components to be mounted are attached thereto. Thereafter, a process for closing the mold assembly 12 is carried out. Then, the cylinder 30 is actuated to feed the mold assembly 12 to the second station 22 along the first feeder 28a.

The cylinder 50 of the reactive resin feeding apparatus 46 is actuated to lower the first movable bodies 56a, 56b along the guide bars 52a, 52b and to downwardly move the mixing head 58 mounted on the first movable bodies 56a, 56b, thereby fitting the injecting head 64 in the injection hole 16 of the mold assembly 12. Then, the cylinder 70 is actuated to move the cylinder rod 68 upward so as to cause the passages 60a, 60b to communicate with each other. Thus, a first step for supplying the liquid reactive resin from the passages 60a, 60b to the injection head 64 through the mixing passage 62 is performed (see FIG. 3). The reactive resin is poured or injected into the cavity 14 from the injection hole 16, followed by reaction (foaming). After its reaction has been completed, the cylinder 70 is actuated to lower the cylinder rod 68 so as to cause the leading end of the cylinder rod 68 to close or block the point at which the passages 60a, 60b are joined together, thereby cutting off the passages 60a, 60b from communicating with each other.

After the above reaction has been completed, the cylinder 70 is actuated to elevate the first movable bodies 56a, 56b in unison with the injection head 64 so as to reach a given vertical position.

Figure 5:
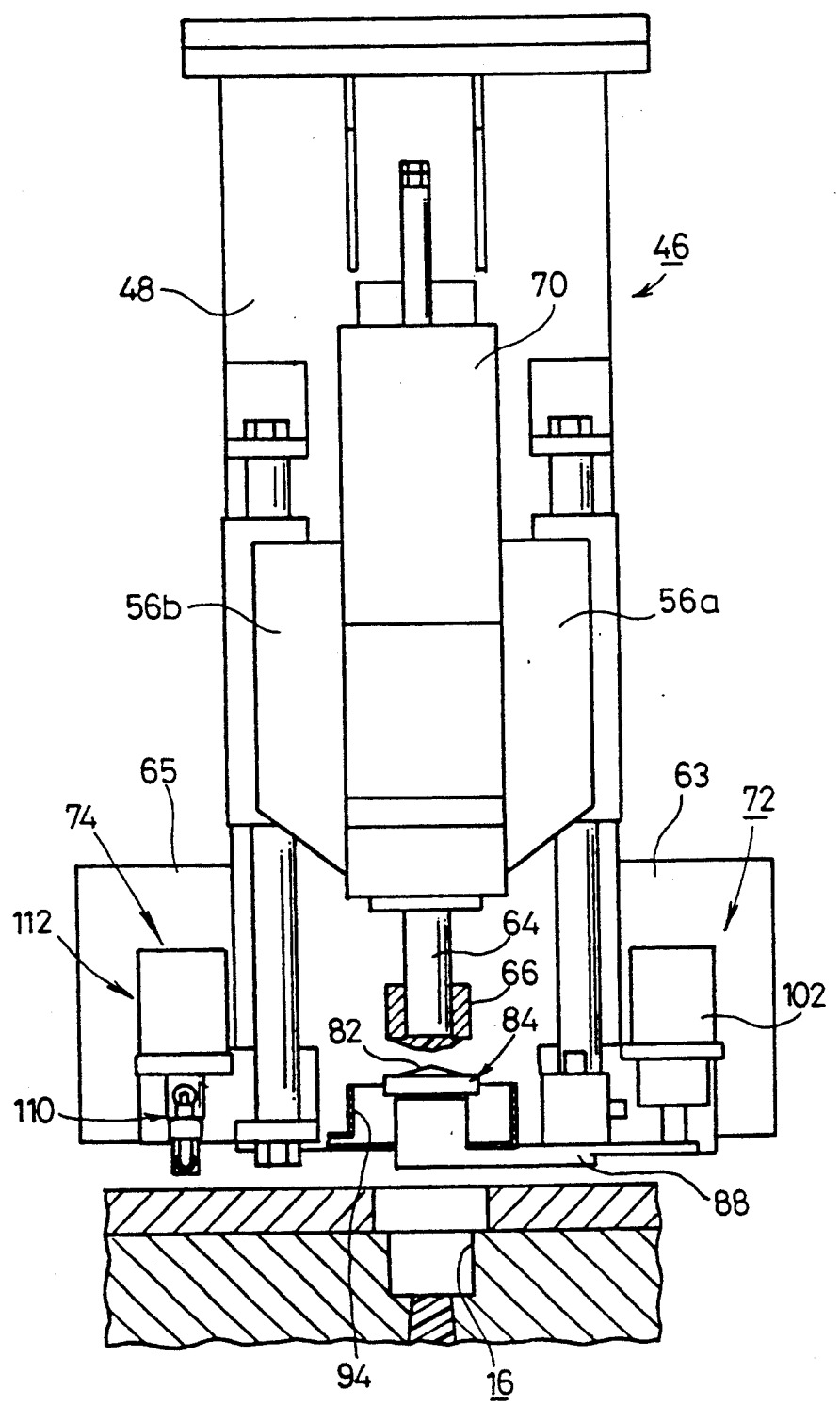
FIG. 5 is a partial cross-sectional view showing the manner of the operation of the deposited-material removing mechanism employed in the reactive resin feeding apparatus.

Then, the cylinder 100 of the turning means 78 of the deposited-material removing mechanism 72 is actuated to extrude the cylinder head 98 so as to turn the second movable table 88 through about 90° about the pin 108 (see FIG. 2). As a result, the rotatable cutter 84 of the automatic cutting means 76 is moved to reach the position between the injection head 64 and the injection hole 16 of the mold assembly 12, thereby terminating a second step (see FIG. 5). Then, the actuator 102 is actuated to lift the second movable body 104 and the second movable table 88 integrally coupled thereto. At the same time, the air motor 86 is energized to cause the timing belt 92 to rotate the rotatable cutter 84. In addition, an unillustrated vacuum suction source is also energized to suck or draw air in the cover 94 provided to cover the outer periphery of the rotatable cutter 84. Then, a third step for bringing the rotatable blades 82 mounted on the rotatable cutter 84 into contact with a reactive resin adhering to and hardened at the lower ends of the injection head 64 and the seat portion 66 and for cutting the hardened reactive resin from below is carried out. At this time, fragments of the cut reactive resin and cut powder are sucked or drawn into the vacuum suction source through the cover 94.

In the present embodiment, as described above, the deposited-material removing mechanism 72 is activated to remove the reactive resin adhering to and hardened at the lower end of the injection head 64. In particular, the deposited-material removing mechanism 72 is operated to remove the reactive resin which adheres to the injection head 64 while the rotatable blades 82 mounted on the rotatable cutter 84 is being rotated. Therefore, this method enables easy removal of the deposited material from the injection head 64 without imposing a forcible burden on the injection head 64 and subjecting the injection head 64 to damage as compared with a deposited-material removing method which has conventionally been carried out. Since the cut powder produced by the deposited-material removing process is forcibly sucked or drawn, it is possible to prevent the reactive resin feeding apparatus 46 from contamination and to prevent the removed material from splashing around the reactive resin feeding apparatus. Further, since the deposited-material removing process is automatically carried out, any burden imposed on an operator can be reduced or lightened and a molding process can be automated and efficiently and easily be carried out.

After the hardened reactive resin has been removed from the injection head 64, the air motor 86 is then de-energized to cause the rotatable cutter 84 to stop rotating. Thereafter, the actuator 102 is activated to lower the second movable body 104 and the second movable table 88. Further, the cylinder 100 is actuated to turn the second movable table 88 through about 90° about the pin 108, thereby separating the rotatable cutter 84 of the automatic cutting means 76 from between the injection head 64 and the injection hole 16 of the mold assembly 12.

Then, the motor 114 of the parting-agent applying mechanism 74 is energized to turn the coating nozzle 118 in unison with the arm 116 in such a manner as to be moved into the position between the injection head 64 and the injection hole 16 of the mold assembly 12. Further, a parting agent supplied from the unillustrated parting-agent feed source is injected into the injection head 64 and the seat portion 66 from the coating nozzle 118 (see FIG. 6).

After the above parting-agent applying process has been finished, the motor 114 is energized to move the coating nozzle 118 to a given position.

In the present embodiment, as described above, after the deposited-material removing process has been made by the deposited-material removing mechanism 72, a process for applying the parting agent to the injection head 64 is carried out by the parting-agent applying mechanism 74. It is therefore possible to minimize adhesion of the reactive resin to the injection head 64.

After the reactive resin has been poured into the mold assembly 12, the motor 34a is energized to cause the first movable table 36a to move the mold assembly 12 toward the third station 24. Then, the motor 40 is energized to feed the mold assembly 12 to the fourth station 26, where the reactive resin in the mold assembly 12 is hardened. Thereafter, the first movable table 36b is moved to feed the mold assembly 12 to the first station 20 thereby to remove a molded product from the mold assembly 12.

The method of and the apparatus according to the present invention, for removing the resinous materials which adhere to the injection head can bring about the following advantages.

When an injection head is separated from an injection hole after a molten resin has been poured into a cavity of a mold assembly and hardened therein, an automatic cutting means of a deposited-material removing mechanism is moved to the position between the injection head and the injection hole so as to cause rotatable blades to cut or remove a resin material exposed outwardly from the injection head. Therefore, the resin material can be removed from the injection head without doing damage to the injection head. It is also possible to effectively prevent a reactive resin from adhering to the injection head when the next molding process is carried out.

Further, since a resin material removing process is automatically performed, any burden imposed on the operator can be lightened and the entire molding process can efficiently be carried out.

Having now fully described the invention, it will be apparent to those skilled in the art that many changes and modifications can be made without departing from the spirit or scope of the invention as set forth herein.

What is claimed is:

1. A method of removing resinous material adhering to an injection head, comprising steps of:
   pouring liquid reactive resin into a molding cavity internally defined in a mold assembly from an injection head through an injection hole defined in said mold assembly;
   displacing automatic cutting means toward said injection head separated from said injection hole after the reactive resin poured into said molding cavity has been hardened, said automatic cutting means being provided with at least one rotatable blade having the apex thereof adjacent to a rotary axis of said cutting means;
   advancing said cutting means toward the injection hole so as to position the apex of the rotatable blade in a mixing passage in said injection head; and
   cutting away the resin stuck to said injection head with the rotary action of said rotatable blades.

2. A method according to claim 1, further comprising a step of applying parting compound to said injection head after effecting the step of cutting.

* * * * *